US012647239B2

(12) United States Patent
Matsumura et al.

(10) Patent No.: US 12,647,239 B2
(45) Date of Patent: Jun. 2, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 295 days.

(21) Appl. No.: 18/699,852

(22) PCT Filed: Oct. 7, 2022

(86) PCT No.: PCT/JP2022/037539
§ 371 (c)(1),
(2) Date: Apr. 9, 2024

(87) PCT Pub. No.: WO2023/063235
PCT Pub. Date: Apr. 20, 2023

(65) Prior Publication Data
US 2025/0015963 A1      Jan. 9, 2025

(30) Foreign Application Priority Data

Oct. 15, 2021      (JP) ................................. 2021-169864

(51) Int. Cl.
*H04L 5/00* (2006.01)
(52) U.S. Cl.
CPC .................................. *H04L 5/0094* (2013.01)
(58) Field of Classification Search
CPC ..... H04L 5/0094; H04L 5/0053; H04B 7/022; H04W 16/32
See application file for complete search history.

(56) References Cited

U.S. PATENT DOCUMENTS 11,832,285 B2 * 11/2023 Park ...................... H04W 76/11
12,113,741 B2 * 10/2024 Matsumura ........ H04B 7/06964

FOREIGN PATENT DOCUMENTS

WO      WO-2020059153 A1 *   3/2020   ............ H04W 72/23

OTHER PUBLICATIONS

International Search Report issued in PCT/JP2022/037539 on Dec. 6, 2022 (5 pages).
Written Opinion of the International Searching Authority issued in PCT/JP2022/037539 on Dec. 6, 2022 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)"; Mar. 2010 (149 pages).

* cited by examiner

*Primary Examiner* — Mohammad S Anwar
(74) *Attorney, Agent, or Firm* — Osha Bergman Watanabe & Burton LLP

(57) ABSTRACT

Even when inter-cell mobility is performed using a plurality of transmission/reception points, communication is appropriately performed. A terminal according to one aspect of the present disclosure includes a receiving section that receives information related to activation of a transmission configuration indication (TCI) state, and a control section that controls monitoring of a downlink control channel related to paging, based on whether or not the TCI state corresponding to a serving cell is included in the TCI state to be activated.

5 Claims, 14 Drawing Sheets

SERVING CELL                    NON-SERVING CELL

| Bit | Short Message |
|---|---|
| 1 | systemInfoModification<br>If set to 1 indication of a BCCH modification other than SIB6, SIB7 and SIB8. |
| 2 | etwsAndCmasIndication<br>If set to 1 indication of an ETWS primary notification and/or an ETWS secondary notification and/or a CMAS notification. |
| 3 | stopPagingMonitoring<br>This bit can be used for only operation with shared spectrum channel access and if *nrofPDCCH-MonitoringOccasionPerSSB-InPO* is present.<br>If set to 1 indication that the UE may stop monitoring PDCCH occasion(s) for paging in this Paging Occasion as specified in TS 38.384 [23], clause 7.1. |
| 4 – 8 | Not used in this release of the specification, and shall be ignored by UE if received |

FIG 2

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, radio communication systems later than Rel. 16/5G), it is assumed that communication is controlled based on mobility among a plurality of cells (inter-cell mobility) including a non-serving cell or inter-cell mobility using a plurality of transmission/reception points (for example, multi-TRP (MTRP).

However, when communication is performed based on inter-cell mobility, how to control reception of given information/signal/channel transmitted from a given cell poses a problem. For example, when a UE receives given information/signal/channel transmitted from a given cell, how to control quasi-co-location assumption (for example, QCL assumption)/transmission configuration indication (for example, TCI) state poses a problem.

The present disclosure is made in view of such problems, and has an object to provide a terminal, a radio communication method, and a base station that can appropriately perform communication even when inter-cell mobility is performed using a plurality of transmission/reception points.

Solution to Problem

A terminal according to one aspect of the present disclosure includes a receiving section that receives information related to activation of a transmission configuration indication (TCI) state, and a control section that controls monitoring of a downlink control channel related to paging, based on whether or not the TCI state corresponding to a serving cell is included in the TCI state to be activated.

Advantageous Effects of Invention

According to one aspect of the present disclosure, even when inter-cell mobility is performed using a plurality of transmission/reception points, communication can be appropriately performed.

BRIEF DESCRIPTION OF DRAWINGS

FIG. 2 shows an example of a short message of paging.

DESCRIPTION OF EMBODIMENTS

TCI, Spatial Relation, QCL

Figure 1A:
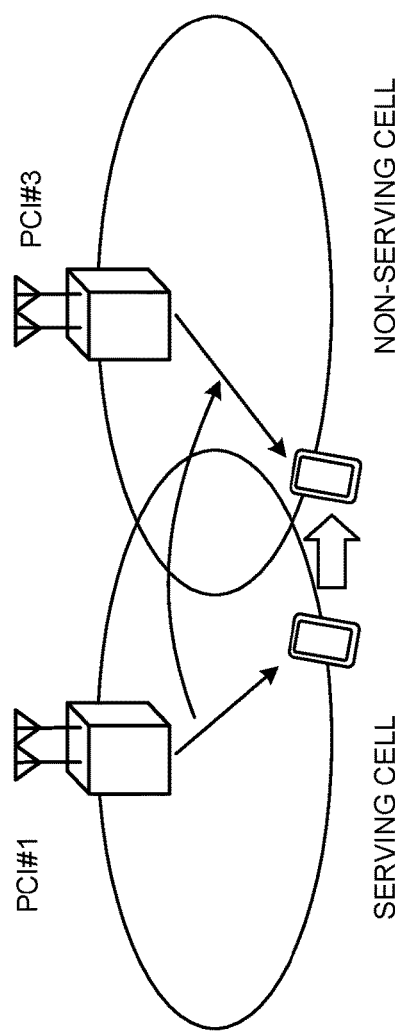
FIG. 1A and FIG. 1B are diagrams to show examples of inter-cell mobility.

For NR, control of reception processing (for example, at least one of reception, demapping, demodulation, and decoding) and transmission processing (for example, at least one of transmission, mapping, precoding, modulation, and coding) of at least one of a signal and a channel (expressed as a signal/channel) in a UE, based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that a channel/signal being a target of application of a TCI state may be referred to as a target channel/reference signal (RS) or simply as a target, and another signal described above may be referred to as a reference reference signal (reference RS) and a source RS or simply as a reference.

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), a reference signal for QCL detection (also referred to as a QRS), a demodulation reference signal (DMRS), and the like.

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a given channel/signal, and this RS may be referred to as a QCL source of QCL type X in the TCI state.

Inter-Cell Mobility

In NR, a scheme in which one or a plurality of transmission/reception points (TRPs) (multi-TRP (MTRP)) perform DL transmission to the UE has been under study. A scheme in which the UE performs UL transmission to one or a plurality of TRPs has been under study.

Figure 1B:
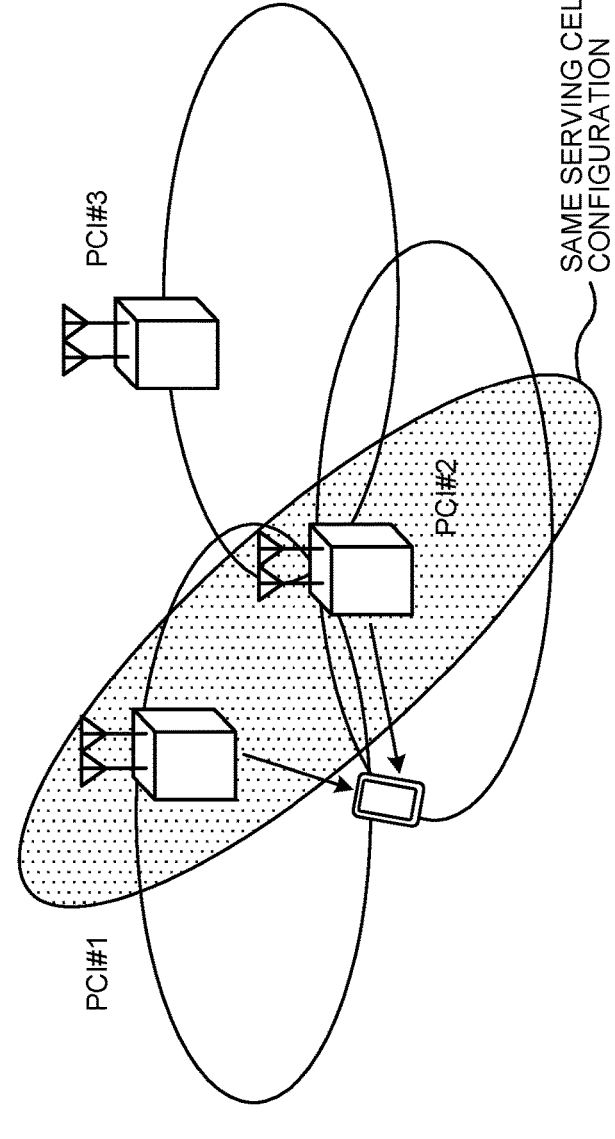

It is considered that the UE receives a channel/signal from a plurality of cells/TRPs in inter-cell mobility (for example, L1/L2 inter cell mobility) (see FIGS. 1A and 1B).

FIG. 1A shows an example of inter-cell mobility (for example, Single-TRP inter-cell mobility) including a non-serving cell. Here, a case is shown in which the UE receives a channel/signal from the base station/TRP in cell #1 being a serving cell and the base station/TRP in cell #3 being other than the serving cell (non-serving cell). For example, this corresponds to a case in which the UE switches/changes from cell #1 to cell #3 (for example, fast cell switch).

In this case, the TCI state may be updated by DCI/MAC CE, and a port (for example, an antenna port)/TRP may be dynamically selected. Different physical cell IDs (for example, PCIs) are configured for cell #1 and cell #3.

FIG. 1B shows an example of a multi-TRP scenario (for example, inter-cell mobility (Multi-TRP inter-cell mobility) of a case in which the multi-TRP is used). Here, a case is shown in which the UE receives a channel/signal from TRP #1 and TRP2. Here, a case is shown in which TRP #1 is present in cell #1 (PCI #1) and TRP #2 is present in cell #2 (PCI #2).

The multi-TRP (TRPs #1 and #2) may be connected via ideal/non-ideal backhaul to exchange information, data, and the like. Each TRP of the multi-TRP may transmit a different codeword (Code Word (CW)) and a different layer. As shown in FIG. 1B, as one mode of multi-TRP transmission, non-coherent joint transmission (NCJT) may be employed. Here, a case is shown in which NCJT is performed among a plurality of cells (for example, cells having different PCIs). Note that the same serving cell configuration may be applied to/configured for TRP #1 and TRP #2.

In NCJT, for example, TRP #1 performs modulation mapping on a first codeword and performs layer mapping so as to transmit a first signal/channel (for example, a PDSCH) by using first precoding for a first number of layers (for example, two layers). TRP #2 performs modulation mapping on a second codeword and performs layer mapping so as to transmit a second signal/channel (for example, a PDSCH) by using second precoding for a second number of layers (for example, two layers).

It may be defined that a plurality of PDSCHs (multi-PDSCH) subjected to NCJT partially or entirely overlap in at least one of time and frequency domains. In other words, at least one of time and frequency resources of the first PDSCH from TRP #1 and the second PDSCH from TRP #2 may overlap.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a given QCL type (for example, QCL type D).

The plurality of PDSCHs (which may be referred to as the multi-PDSCH (multiple PDSCH)) from the multi-TRP may be scheduled using one DCI (single DCI (S-DCI), single PDCCH) (single master mode). One DCI may be transmitted from one TRP of the multi-TRP. The configuration of using one DCI in the multi-TRP may be referred to as single DCI-based multi-TRP (mTRP/MTRP).

The plurality of PDSCHs from the multi-TRP may be scheduled using a plurality of DCIs (multi-DCI (M-DCI), multi-PDCCH (multiple PDCCH)), respectively (multi-master mode). The plurality of DCIs may be transmitted from the multi-TRP, respectively. The configuration of using the plurality of DCIs in the multi-TRP may be referred to as multi-DCI-based multi-TRP (mTRP/MTRP).

The UE may assume to transmit, to different TRPs, different CSI reports related to the respective TRPs. Such CSI feedback may be referred to as separate feedback, separate CSI feedback, and the like. In the present disclosure, "separate" may be interchangeably interpreted as "independent."

Paging

In existing systems (for example, LTE), a change notification of system information using paging information (Paging message) is supported for a user terminal in an RRC connected state (RRC_CONNECTED) and a user terminal in an RRC idle state (RRC_IDLE). The change notification of the system information using the paging information (Paging message) is also supported in NR. In NR, the change notification of the system information using the paging information (Paging message) can be performed for each of a user terminal in an RRC connected state (RRC_CONNECTED), a user terminal in an RRC idle state (RRC_IDLE), and a user terminal in an RRC inactive state (RRC_INACTIVE).

In NR, the UE in the RRC idle state or the RRC inactive state (RRC_INACTIVE) performs discontinuous reception (DRX) of a given cycle in order to reduce power consumption. The UE monitors one paging occasion (PO) in each cycle of DRX (DRX cycle).

Here, the PO is a set of monitoring occasions (periods for monitoring, PDCCH monitoring occasions) of the downlink control channel (for example, the PDCCH). The PO may include one or more time domain resource units (for example, one or more slots, one or more subframes, one or more symbols).

In PO, downlink control information (DCI) (DCI for paging, paging DCI, DCI format 1_0) for scheduling the downlink shared channel (for example, the PDSCH) for transmitting the paging message is transmitted. The paging DCI may include cyclic redundancy check (CRC) bits scrambled with a given radio network temporary identifier (Paging-Radio Network Temporary Identifier (P-RNTI)). When the user terminal detects the downlink control information whose CRC is scrambled with the P-RNTI, the user terminal can determine that the downlink control information is the paging DCI for scheduling the PDSCH for transmitting the paging message.

One paging frame (PF) is one radio frame, and may include one or more POs. The PF may be a start point of the PO. Each radio frame may be identified with a system frame number (SFN).

In the RRC connected state (RRC_CONNECTED), when the UE is provided with a common search space (paging search space) for monitoring the paging, the UE monitors the paging DCI in at least one PO in a change period of the system information.

The UE receives an indication related to at least one of a system information change and a Public Warning System (PWS) notification, based on a short message transmitted using the paging DCI.

The system information may include Earthquake and Tsunami Warning System (ETWS), Commercial Mobile Alert Service (CMAS), Extended Access Barring (EAB), or the like.

In LTE, SIB10 (SystemuInformatoinBlockType10) includes a primary notification (short notification) for ETWS, and SIB11(SystemuInformatoinBlockType11) includes a secondary notification (detailed information) for ETWS.

In NR, SIB6 includes a primary notification for ETWS, and SIB7 includes a secondary notification for ETWS.

It is assumed the UE also receives given information/signal/channel (for example, paging) when inter-cell mobility (for example, L1/L2 inter cell mobility) is supported/applied.

The following case is assumed in which, with a UE capability (for example, a minimum UE capability) of inter-cell mobility, only the TCI state corresponding only to any one physical cell ID (for example, PCI) can be activated. For example, only the TCI state corresponding to the PCI of the serving cell or only the TCI state corresponding to a PCI different from the PCI of the serving cell can be activated. When the PCI corresponding to the TCI state is switched, all of the TCI states may be updated using a MAC CE or the like.

In this case, when only the TCI state associated with the PCI different from the PCI of the serving cell is activated, how to perform paging monitoring control (for example, whether or not monitoring is performed, or QCL assumption of paging reception when monitoring is performed) poses a problem.

The inventors of the present invention studied control of QCL assumption/TCI state in inter-cell mobility (for example, L1/L2 inter cell mobility), and came up with the idea of the present embodiment.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted. In the present disclosure, "A/B/C" may mean "at least one of A, B, and C".

In the present disclosure, activate, deactivate, indicate, select, configure, update, determine, and the like may be interchangeably interpreted. In the present disclosure, "support," "control," "controllable," "operate," "operable", and the like may be interchangeably interpreted.

In the present disclosure, radio resource control (RRC), an RRC parameter, an RRC message, a higher layer parameter, an information element (IE), a configuration, and the like may be interchangeably interpreted. In the present disclosure, a Medium Access Control control element (MAC Control Element (CE)), an update command, an activation/deactivation command, and the like may be interchangeably interpreted.

In the present disclosure, the higher layer signaling may be, for example, any one or combinations of Radio Resource Control (RRC) signaling, Medium Access Control (MAC) signaling, broadcast information, and the like.

In the present disclosure, the MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, physical layer signaling may be, for example, downlink control information (DCI), uplink control information (UCI), or the like.

In the present disclosure, an index, an identifier (ID), an indicator, a resource ID, and the like may be interchangeably interpreted. In the present disclosure, a sequence, a list, a set, a group, a cluster, a subset, and the like may be interchangeably interpreted.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), an antenna port (for example, a demodulation reference signal (DMRS) port), an antenna port group (for example, a DMRS port group), a group (for example, a spatial relation group, a code division multiplexing (CDM) group, a reference signal group, a CORESET group, a Physical Uplink Control Channel (PUCCH) group, a PUCCH resource group), a resource (for example, a reference signal resource, an SRS resource), a resource set (for example, a reference signal resource set), a CORESET pool, a downlink Transmission Configuration Indication state (TCI state) (DL TCI state), an uplink TCI state (UL TCI state), a unified TCI state, a common TCI state, quasi-co-location (QCL), QCL assumption, and the like may be interchangeably interpreted.

A spatial relation information Identifier (ID) (TCI state ID) and spatial relation information (TCI state) may be interchangeably interpreted. The "spatial relation information" may be interchangeably interpreted as a "set of pieces of spatial relation information", "one or a plurality of pieces of spatial relation information", or the like. A TCI state and a TCI may be interchangeably interpreted.

In the following description, description will be given by taking an example of an operation of receiving the paging (or the DCI/PDCCH related to the paging), but this is not restrictive. The present embodiment may also be applied in a case of reception of information/signal/channel other than the paging (for example, information/signal/channel related to the DCI/PDCCH using the common search space). In the following description, a PDCCH and a PDCCH candidate may be interchangeably interpreted. A search space and a search space set may be interchangeably interpreted.

Radio Communication Method

When the UE supports only a single active TCI state, a beam indication (for example, activation of one TCI state) based on a MAC CE may be used for switching DL reception in accordance with two different beams.

As a UE operation after only one TCI state is activated, the UE may stop monitoring of a non-UE-dedicated signal/channel in a previous TCI state, and start monitoring of a UE-dedicated signal/channel using one newly activated TCI state.

In this case, considering that the paging may be associated with a non-UE-dedicated common search space, how a network (for example, the base station) performs the paging for the UE is unclear. Thus, after only one TCI state is activated by a MAC CE, the QCL assumption/TCI state of the UE for receiving a paging signal (for example, a paging signal) may be made clear.

In the present disclosure, paging may be interpreted as paging information/paging message/paging signal. In the present disclosure, paging may be paging information transmitted using the PDSCH, or a message included in the DCI whose CRC is scrambled with the P-RNTI (or transmitted on a corresponding PDCCH). The message included in the DCI whose CRC is scrambled with the P-RNTI (or transmitted on a corresponding PDCCH) may be a short message.

In the present disclosure, paging may include the DCI whose CRC is scrambled with the P-RNTI, or may include the PDSCH (or the paging information/message) scheduled by the DCI. Paging may include the short message indicated by the DCI whose CRC is scrambled with the P-RNTI, or may include the PDSCH (or the short message) scheduled by the DCI.

The short message may include at least one of system information modification (systemInfoModification) information, earthquake and tsunami warning system (ETWS) information, and commercial mobile alert service (CMAS) information (see FIG. 2).

The DCI for reading/acquiring the paging (for example, the DCI whose CRC is scrambled with the P-RNTI/PDCCH) may be supported by a given common search space. The given common search space may be a type 2-PDCCH CSS, for example. The type 2-PDCCH CSS may be configured/supported by a given higher layer parameter (for example, pagingSearchSpace in PDCCH-ConfigCommon).

For example, a set of PDCCH candidates monitored by the UE may be defined from the perspective of a PDCCH search space set. The search space set may include a common search space set (a CSS set) or a UE-specific search space set (for example, a USS set). The UE performs monitoring of the PDCCH candidates in one or more of a plurality of search space sets. For example, the UE performs monitoring of the PDCCH candidates in a type 2-PDCCH CSS set configured by pagingSearchSpace in PDCCH-ConfigCommon regarding a DCI format whose CRC is scrambled with the P-RNTI in a primary cell of an MCG.

It is also assumed that, in inter-cell mobility of future NR (for example, Rel. 17 or later versions), the UE operation is controlled so as not to read (or not to acquire/monitor) the common search space (CSS/CSS set) from the non-serving cell (for example, the Non-serving cell). In this case, transmission of the DCI for reading the paging using a given search space (for example, a UE-specific search space (USS/USS set), a specific common search space (CSS/CSS set)) may be supported.

For example, the UE may control monitoring of the downlink control channel related to the paging (for example, whether or not monitoring is performed/the search space used for monitoring/the TCI state used for monitoring), based on whether or not the TCI state corresponding to the serving cell is included in the TCI state to be activated.

In the present embodiment, if only the TCI state corresponding to the PCI different from the PCI of the serving cell is activated, the UE may control monitoring of the paging (for example, whether or not monitoring is performed/QCL assumption), using at least one of the following option 1-1 to option 1-3. Option 1-1 to option 1-3 may be applied in a switching manner, or the UE may be notified of/configured with which option is to be applied by a higher layer parameter.

Note that, in the present disclosure, the physical cell ID (for example, the PCI) may be interpreted as a cell ID, a cell identifier, a cell index, a transmission/reception point ID, or a given ID. In the present disclosure, a case in which only the TCI state corresponding to the PCI different from the PCI of the serving cell is activated may be interpreted as a case in which the TCI state corresponding to the PCI of the serving cell is not activated, or a case in which the TCI state corresponding to the serving cell is not included in the TCI state to be activated.

Option 1-1

Figure 3:
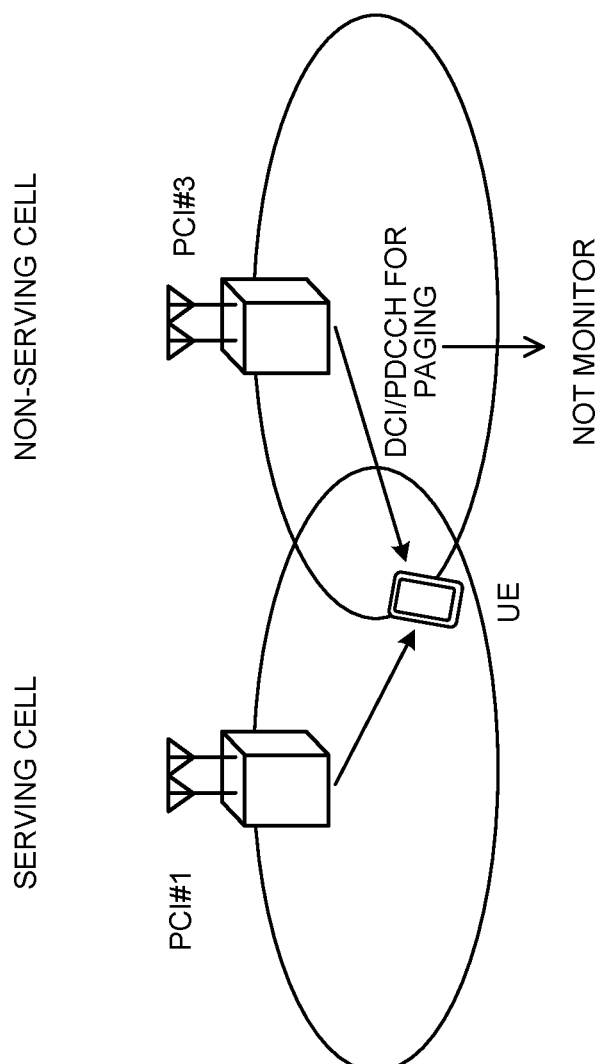
FIG. 3 shows an example of DCI/PDCCH for paging according to the present embodiment.

The UE may be configured not to perform monitoring of the paging related to/corresponding to a newly activated TCI state (or not to be required to perform the monitoring) (see FIG. 3). In other words, when only the TCI state corresponding to the PCI (for example, the PCI of the non-serving cell) different from the PCI of a given cell (for example, the serving cell) is activated, the UE need not be required to perform monitoring for the paging.

Information related to the newly activated TCI state (for example, the TCI state corresponding to the non-serving cell) may be notified from the serving cell using RRC/MAC CE, or may be notified from the non-serving cell using RRC/MAC CE.

Consequently, even when only the common search space (CSS) is supported for the DCI for reading the paging and the configuration of not reading/monitoring the CSS from the non-serving cell is introduced, communication can be appropriately performed.

Option 1-2

Figure 4:
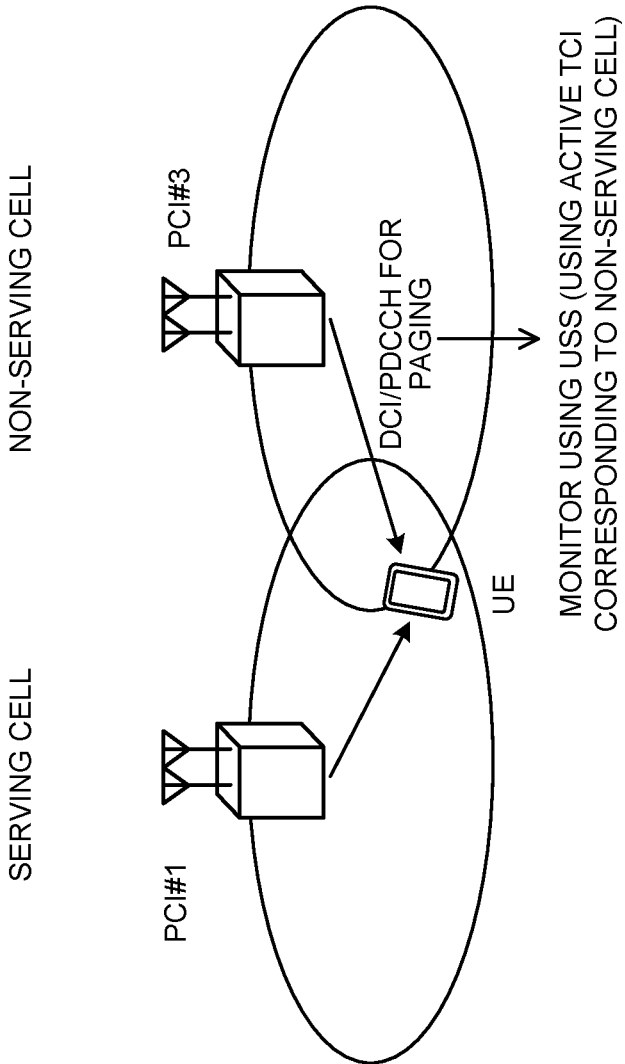
FIG. 4 shows another example of reception control of DCI/PDCCH for paging according to the present embodiment.

The USS may be supported regarding the paging. The UE may be configured to monitor the paging in the USS related to/corresponding to a newly activated TCI state (or to be required to perform the monitoring) (see FIG. 4). In other words, when only the TCI state corresponding to the PCI (for example, the PCI of the non-serving cell) different from the PCI of a given cell (for example, the serving cell) is activated, the UE may monitor the USS, and receive/acquire the paging (or the DCI for the paging).

A higher layer parameter may configure that the USS is for paging reception. For example, the paging search space (for example, pagingSearchSpace) may be configured in a control resource set/PDCCH. The control resource set configured with the paging search space may not be configured with other search spaces.

Information related to the newly activated TCI state (for example, the TCI state corresponding to the non-serving cell) may be notified from the serving cell using RRC/MAC CE, or may be notified from the non-serving cell using RRC/MAC CE.

Consequently, even when the configuration of not reading/monitoring the CSS from the non-serving cell is introduced, the paging from the non-serving cell can be appropriately acquired using the USS.

Option 1-3

Figure 5:
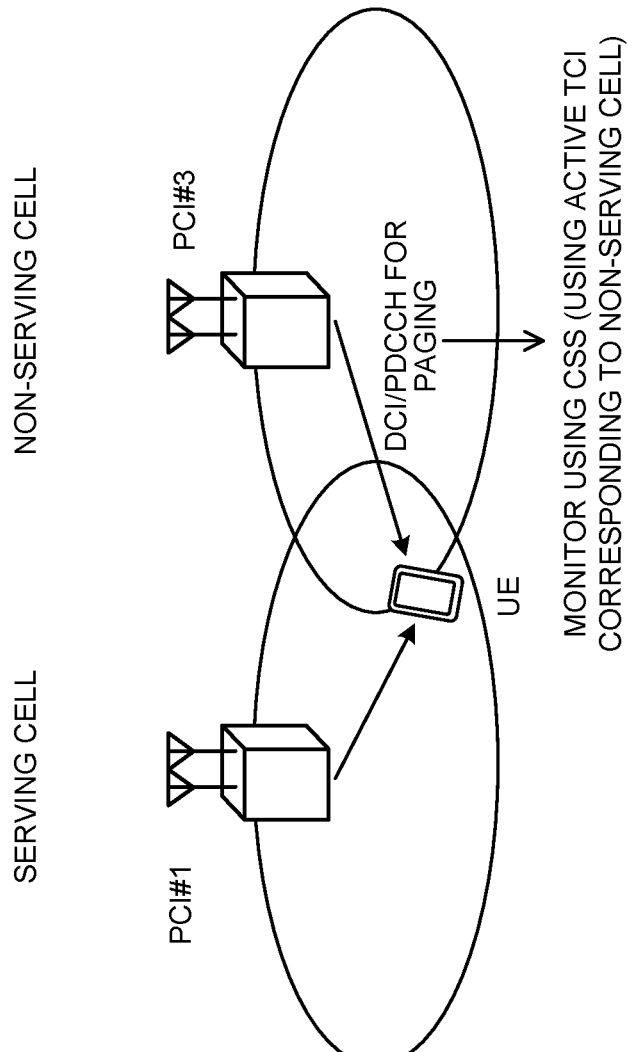
FIG. 5 shows another example of reception control of DCI/PDCCH for paging according to the present embodiment.

The CSS may be configured for the paging corresponding to a newly activated TCI state, and monitoring of the paging may be supported/permitted in the CSS (see FIG. 5). The UE may be configured to monitor the paging in the CSS configured for the paging (or to be required to perform the monitoring) in the newly activated TCI state.

In other words, when only the TCI state corresponding to the PCI (for example, the PCI of the non-serving cell) different from the PCI of a given cell (for example, the serving cell) is activated, based on the TCI state, the UE may monitor the CSS configured for the paging, and receive/acquire the paging (or the DCI for the paging).

Information related to the newly activated TCI state (for example, the TCI state corresponding to the non-serving cell) may be notified from the serving cell using RRC/MAC CE, or may be notified from the non-serving cell using RRC/MAC CE.

Figure 6:
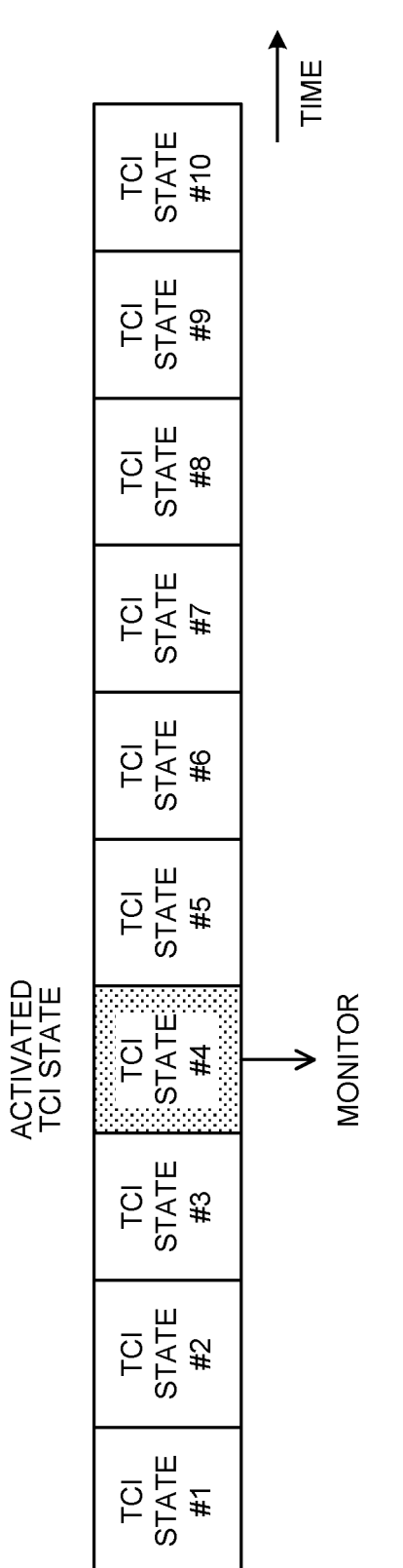
FIG. 6 shows an example of a monitoring occasion of DCI/PDCCH for paging according to the present embodiment.

In option 1-1 to option 1-3, a different monitoring occasion may be configured depending on QCL (or a TCI state) (see FIG. 6). FIG. 6 shows an example of a case in which a monitoring occasion (for example, a PDCCH/PDSCH monitoring occasion) corresponding to a TCI state is configured in the time domain. The UE may control to perform monitoring of the PDCCH, based on the monitoring occasion corresponding to the activated TCI state (here, TCI state #4).

Note that, although FIG. 6 shows the case in which the monitoring occasion corresponding to each TCI state is configured in a time domain direction, the monitoring occasion may be configured in a frequency direction or a combination of time and frequency directions.

The monitoring occasion corresponding to each TCI state may be defined in a specification, or may be notified to/configured for the UE using a higher layer parameter or the like.

Variation 1

The paging/short message may be transmitted using a given type of CSS other than the type 2 PDCCH CSS. The given type of CSS may be, for example, a CSS (for example, a type 3 PDCCH CSS set) used for transmission of group common DCI or the like.

For example, the USS in option 1-2 may be replaced with the CSS used for transmission of the group common DCI or the like. In this case, the paging/short message may be simultaneously transmitted to a plurality of UEs (for example, a plurality of UEs in a given cell). Consequently, resource efficiency can be enhanced.

When a type 3 PDCCH (or the group common DCI) is used, DCI for scheduling the PDSCH for paging/short message transmission may be defined for a series of DCI formats 2. Alternatively, transmission and reception of the paging/short message may be supported using a multicast PDSCH scheduled by a DCI format supported for multicast/broadcast.

Variation 2

It is also assumed that, when the CSS is used, the QCL assumption/TCI state differs depending on the UE that performs reception. Thus, monitoring occasions corresponding to the number of beams may be configured, and based on the QCL/TCI state indicated by the terminal, the UE may select a monitoring occasion and control reception of the PDCCH (see FIG. 7A).

Figures 7A, 7B:
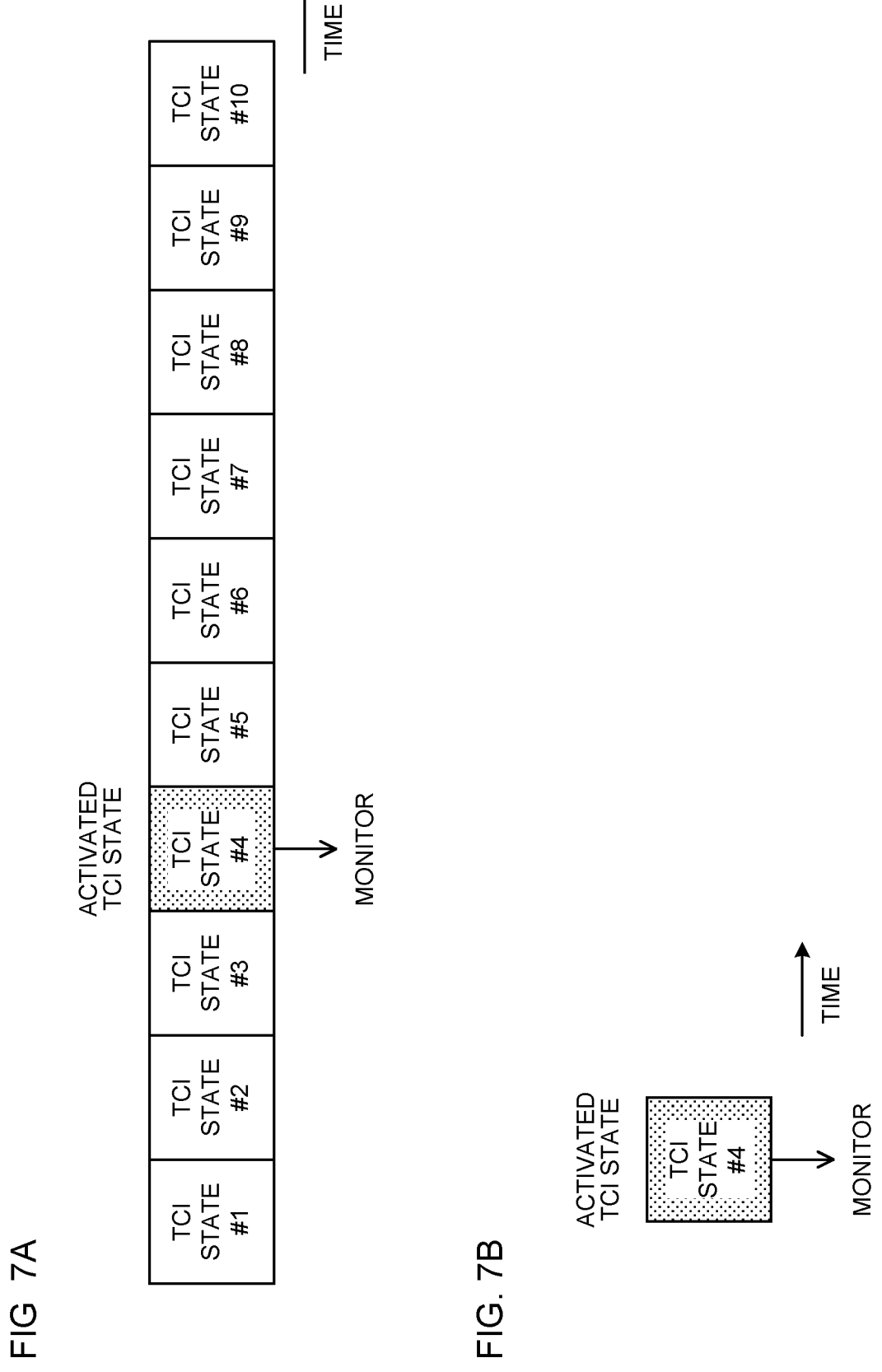
FIG. 7A and FIG. 7B shows other examples of a monitoring occasion of DCI/PDCCH for paging according to the present embodiment.

When the USS is used, a specific (or dedicated) SS can be used for each UE that performs reception, and thus one monitoring occasion may be configured for a given UE, and based on the QCL/TCI state indicated by the terminal, the UE may control reception of the PDCCH (see FIG. 7B).

Because a plurality of UEs (for example, all of the UEs in a given cell) receive the paging, regardless of whether or not reception of the paging DCI (for example, the DCI whose CRC is scrambled with the P-RNTI) is performed in the USS/CSS, a search space (SS) for reception of the paging DCI may be configured. The SS for reception of the paging DCI may be referred to as a paging search space, or may be newly configured.

Figure 8:
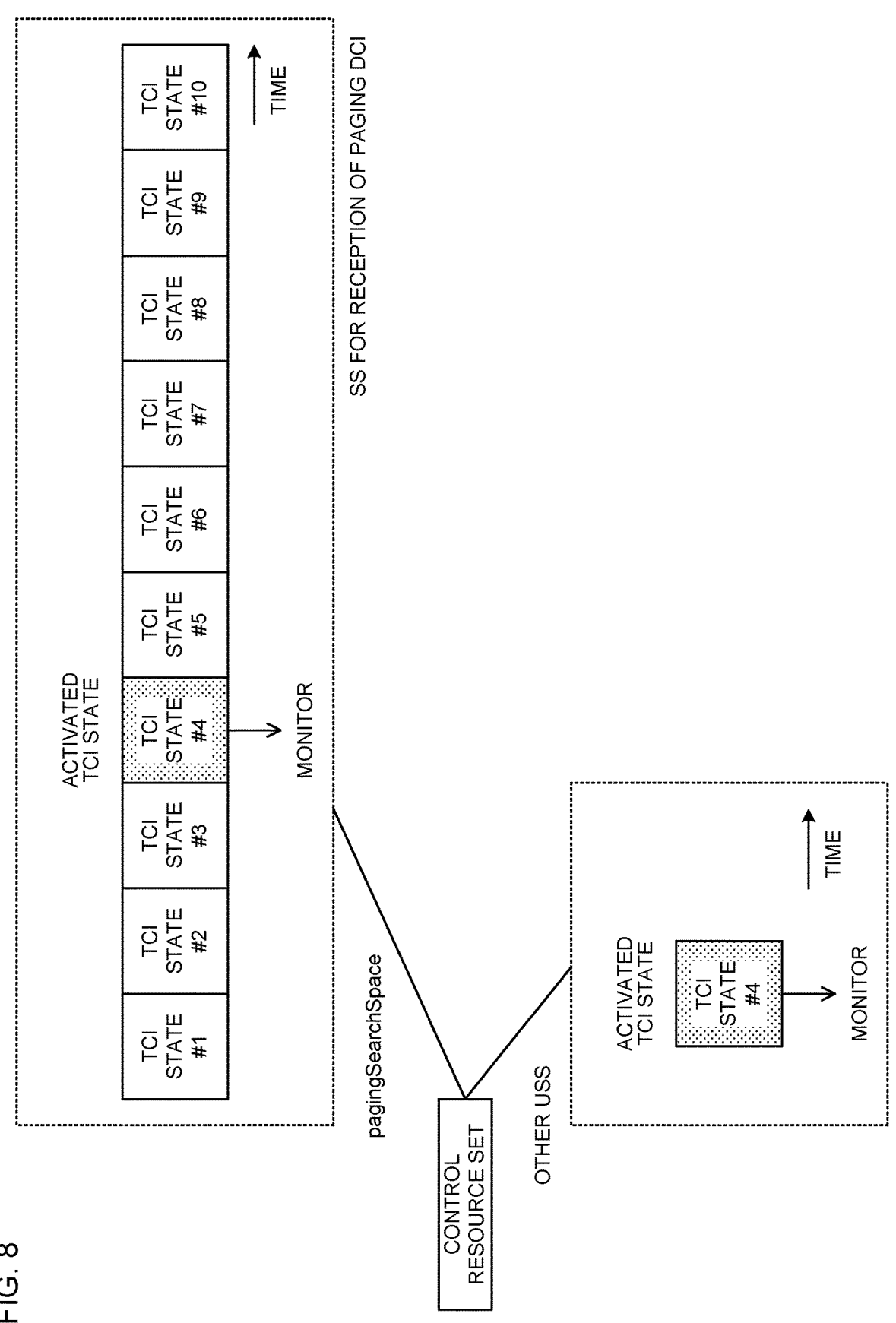
FIG. 8 shows an example of a configuration of a search space set for a control resource set according to the present embodiment.

In the SS for reception of the paging DCI, the UE may select a specific monitoring occasion, based on the QCL assumption/TCI state from a plurality of monitoring occasions. In this case, at least one or both of the SS (for example, pagingSearchSpace) for reception of the paging DCI and another USS may be configured for a given control resource set (or PDCCH) (see FIG. 8). FIG. 8 shows a case in which a plurality of SSs are configured for a control resource set.

For the SS for reception of the paging DCI, based on the QCL/TCI state, the UE may select a specific monitoring occasion from a plurality of monitoring occasions and control monitoring of the PDCCH. On the other hand, for other USSs, the UE may control monitoring of the PDCCH in a monitoring occasion configured to be specific to the UE.

Figure 9:
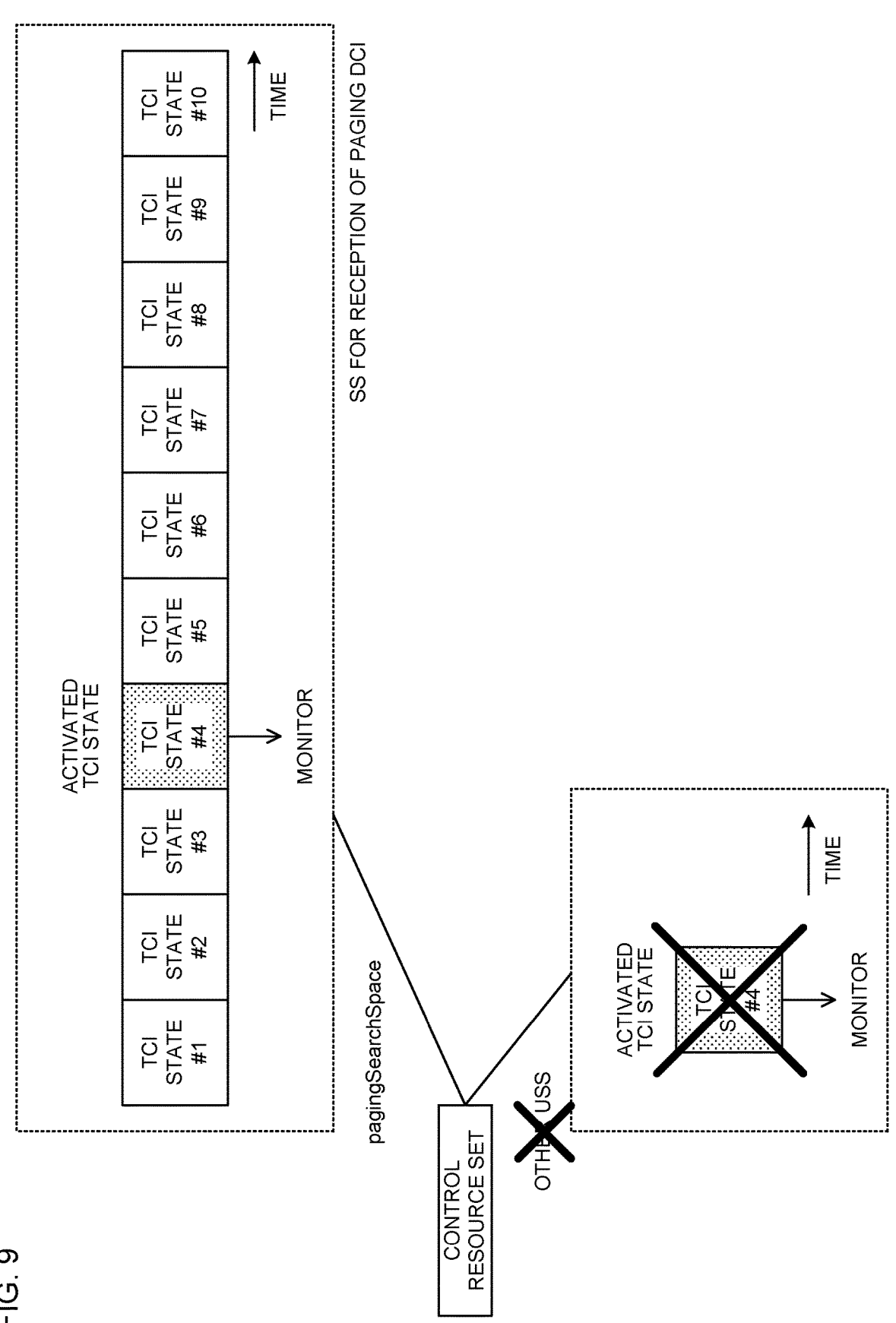
FIG. 9 shows another example of a configuration of a search space set for a control resource set according to the present embodiment.

Alternatively, regarding a given control resource set, when the SS (for example, pagingSearchSpace) for reception of the paging DCI is configured, other USSs (or other SSs) may not be configured (see FIG. 9). In this case, regarding a given control resource set, when the SS (for example, pagingSearchSpace) for reception of the paging DCI is configured, the UE need not assume that other USSs (or other SSs) are configured for the control resource set.

UE Capability Information

In the above embodiment, the following UE capabilities may be configured. Note that the following UE capabilities may be interpreted as parameters (for example, higher layer parameters) configured from a network (for example, the base station) to the UE.

UE capability information related to whether or not inter-cell mobility (for example, L1/L2 inter cell mobility) is supported may be defined. For example, UE capability information related to the number of PCIs of the non-serving cells configured using RRC/MAC CE (for example, an upper limit value of the non-serving cells configured) may be defined. Alternatively, UE capability information related to the number of TCI states of the non-serving cells configured using RRC/MAC CE may be defined.

UE capability information related to whether or not the paging (or the DCI whose CRC is scrambled with the P-RNTI/PDCCH) can be received using the TCI state corresponding to the PCI of the non-serving cell may be defined. For example, UE capability information related to whether or not the paging (or the DCI whose CRC is scrambled with the P-RNTI/PDCCH) can be received using the CSS or whether or not the paging can be received using the USS may be defined.

The above embodiment may be applied to the UE that supports/reports at least one of the UE capabilities described above. Alternatively, the above embodiment may be applied to the UE configured from a network.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
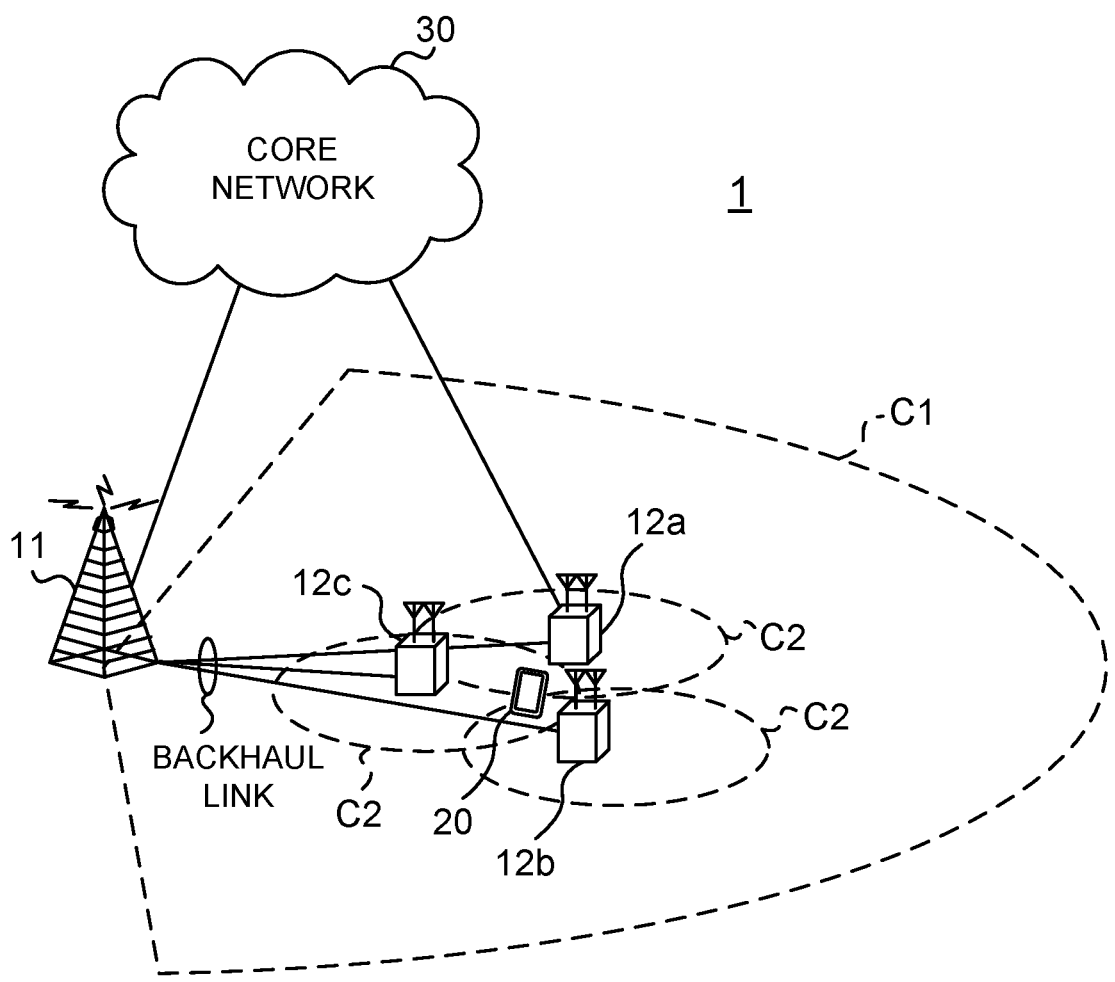
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 11:
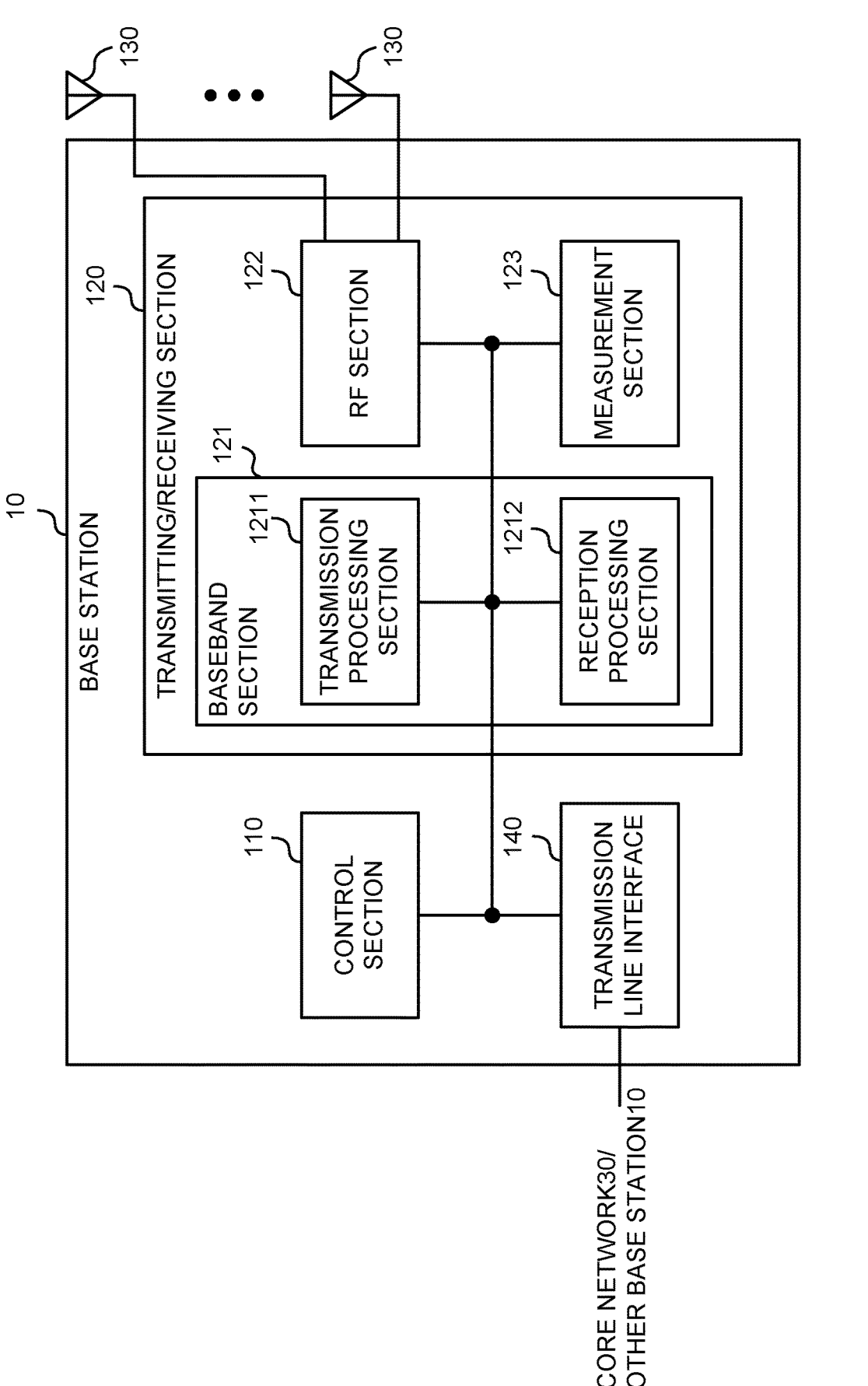
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/ receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/re-ceiver, an RF circuit, a baseband circuit, a filter, a phase shifter, a measurement circuit, a transmitting/receiving cir-cuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be consti-tuted with antennas, for example, an array antenna, or the like described based on general understanding of the tech-nical field to which the present disclosure pertains.

The transmitting/receiving section 120 may transmit the above-described downlink channel, synchronization signal, downlink reference signal, and so on. The transmitting/ receiving section 120 may receive the above-described uplink channel, uplink reference signal, and so on.

The transmitting/receiving section 120 may form at least one of a transmit beam and a receive beam by using digital beam forming (for example, precoding), analog beam form-ing (for example, phase rotation), and so on.

The transmitting/receiving section 120 (transmission pro-cessing section 1211) may perform the processing of the Packet Data Convergence Protocol (PDCP) layer, the pro-cessing of the Radio Link Control (RLC) layer (for example, RLC retransmission control), the processing of the Medium Access Control (MAC) layer (for example, HARQ retrans-mission control), and so on, for example, on data and control information and so on acquired from the control section 110, and may generate bit string to transmit.

The transmitting/receiving section 120 (transmission pro-cessing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and trans-mit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/ receiving antennas 130.

The transmitting/receiving section 120 (reception pro-cessing section 1212) may apply reception processing such as analog-digital conversion, fast Fourier transform (FFT) processing, inverse discrete Fourier transform (IDFT) pro-cessing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement sec-tion 123) may perform the measurement related to the received signal. For example, the measurement section 123 may perform Radio Resource Management (RRM) mea-surement, Channel State Information (CSI) measurement, and so on, based on the received signal. The measurement section 123 may measure a received power (for example, Reference Signal Received Power (RSRP)), a received qual-ity (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), chan-nel information (for example, CSI), and so on. The mea-surement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving sec-tion of the base station 10 in the present disclosure may be constituted with at least one of the transmitting/receiving section 120, the transmitting/receiving antennas 130, and the communication path interface 140.

The transmitting/receiving section 120 may transmit information related to activation of a transmission configu-ration indication (TCI) state.

The control section 110 may control transmission of a downlink control channel related to paging of which moni-toring is controlled, based on whether or not the TCI state corresponding to a serving cell is included in the TCI state to be activated.

User Terminal

Figure 12:
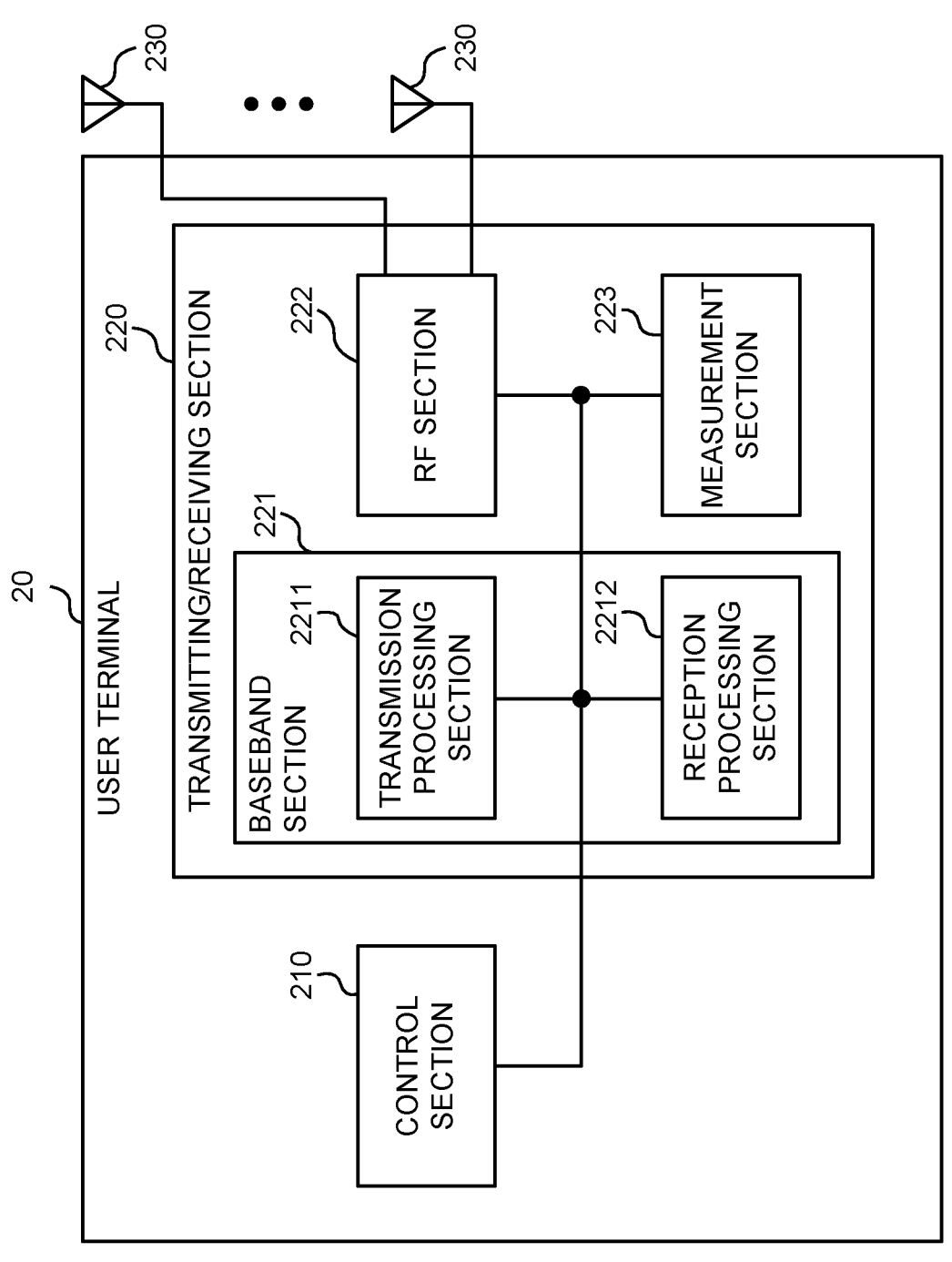
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/ receiving section 220, and transmitting/receiving antennas 230. Note that the user terminal 20 may include one or more control sections 210, one or more transmitting/receiving sections 220, and one or more transmitting/receiving anten-nas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information related to activation of a transmission configuration indication (TCI) state.

The control section 210 may control monitoring of a downlink control channel related to paging, based on whether or not the TCI state corresponding to a serving cell is included in the TCI state to be activated.

When the TCI state corresponding to the serving cell is not included in the TCI state to be activated, the control section 210 may control not to perform monitoring of the downlink control channel related to the paging transmitted from another cell different from the serving cell.

When the TCI state corresponding to the serving cell is not included in the TCI state to be activated, the control section 210 may control to perform monitoring of the downlink control channel related to the paging transmitted from another cell different from the serving cell, using a UE-specific search space.

When the TCI state corresponding to the serving cell is not included in the TCI state to be activated, the control section 210 may control to perform monitoring of the downlink control channel related to the paging transmitted from another cell different from the serving cell, using a specific common search space.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
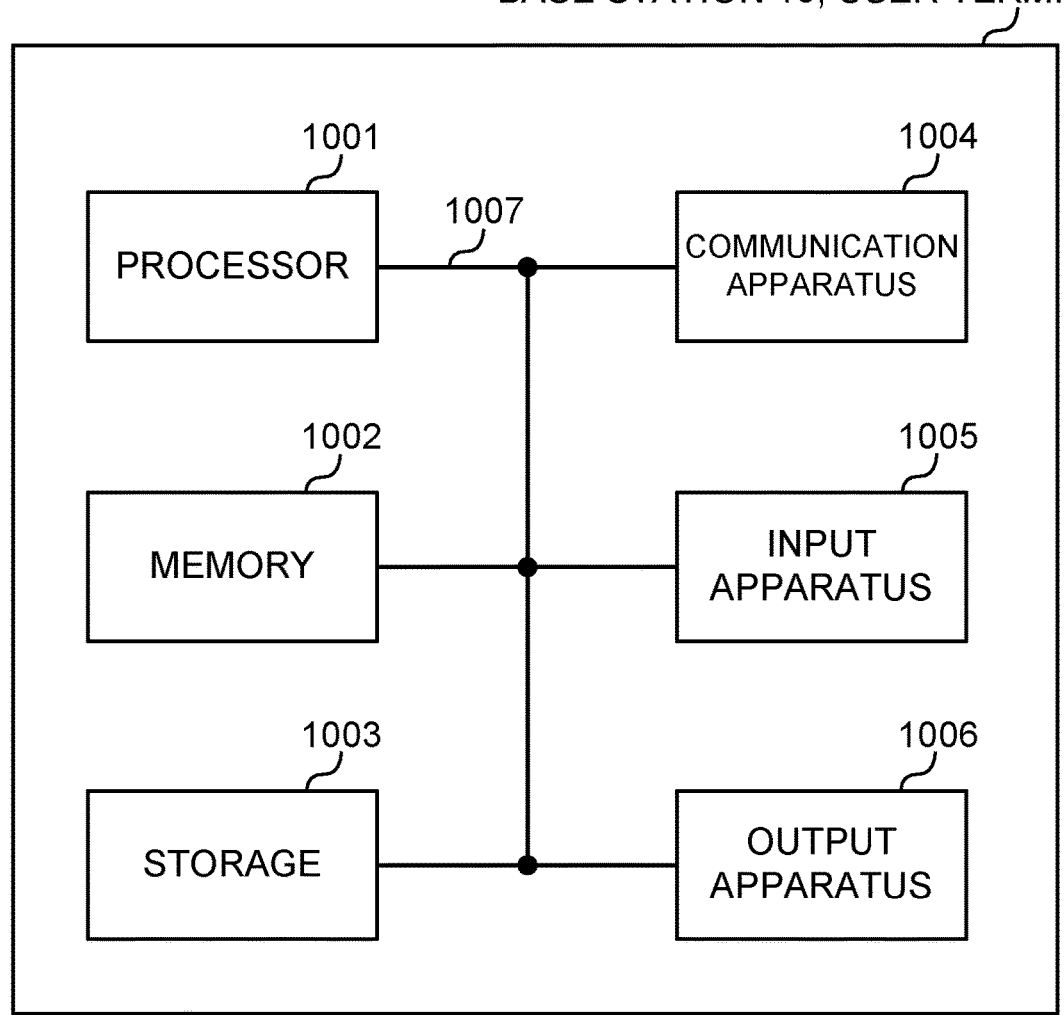
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CES).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal,"

"wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object is a movable object with any moving speed, and naturally a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, a satellite, a drone, a multicopter, a quadcopter, a balloon, and an object mounted on any of these, but these are not restrictive. The moving object may be a moving object that autonomously travels based on a direction for moving.

The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor.

Figure 14:
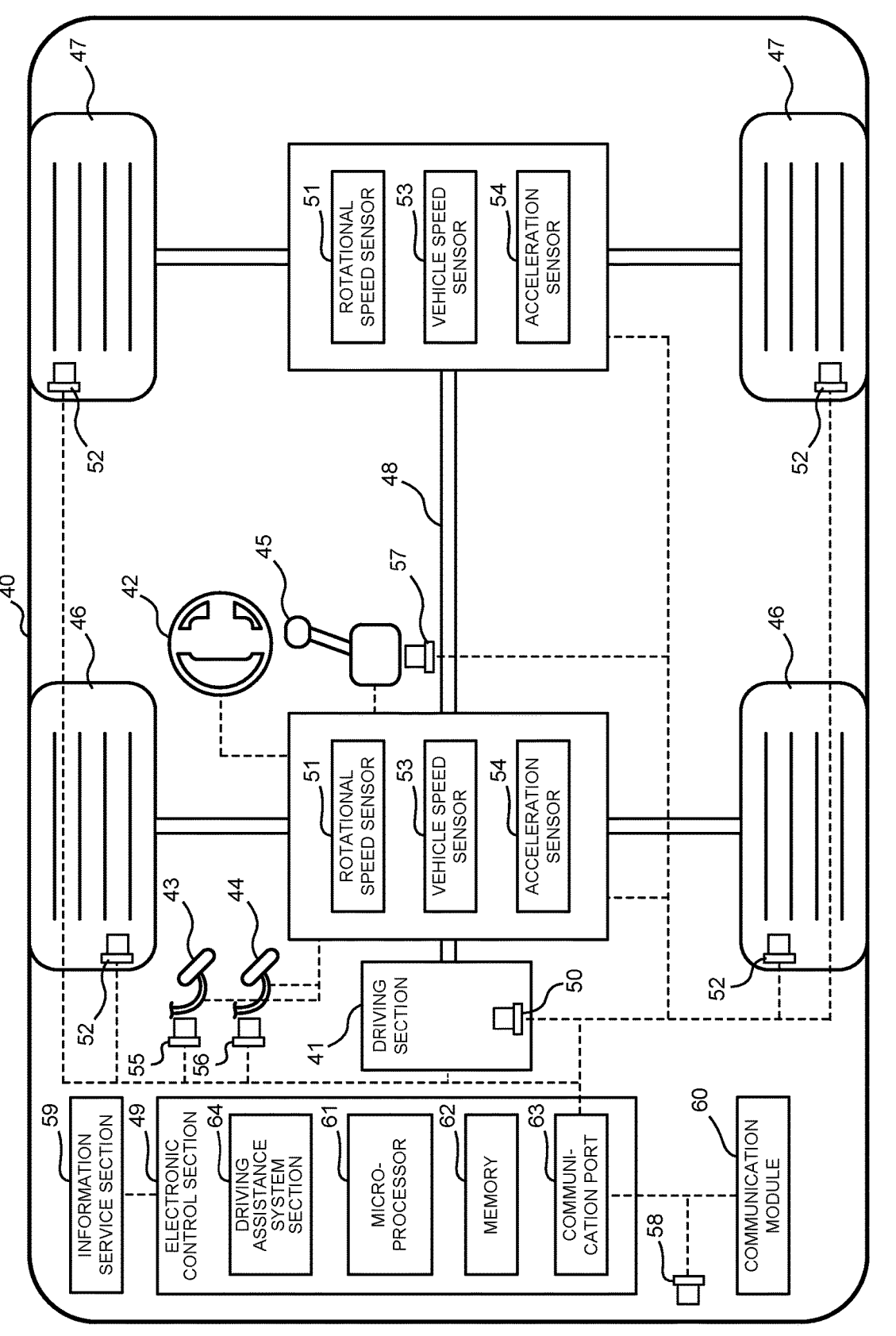
FIG. 14 is a diagram to show an example of a vehicle according to one embodiment.

FIG. 14 is a diagram to show an example of a vehicle according to one embodiment. A vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, a rotational speed sensor 51, a pneumatic sensor 52, a vehicle speed sensor 53, an acceleration sensor 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, a rotational speed signal of the front wheels 46/rear wheels 47 acquired by the rotational speed sensor 51, a pneumatic signal of the front wheels 46/rear wheels 47 acquired by the pneumatic sensor 52, a vehicle speed signal acquired by the vehicle speed sensor 53, an acceleration signal acquired by the acceleration sensor 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing (outputting) various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

The information service section 59 may include an input device (for example, a keyboard, a mouse, a microphone, a switch, a button, a sensor, a touch panel, and the like) for receiving input from the outside, or may include an output device (for example, a display, a speaker, an LED lamp, a touch panel, and the like) for implementing output to the outside.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUs that control these devices. The driving assistance system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, at least one of the base station 10 and the user terminal 20 described above (may function as at least one of the base station 10 and the user terminal 20).

The communication module 60 may transmit at least one of signals from the various sensors 50 to 58 described above input to the electronic control section 49, information obtained based on the signals, and information based on an input from the outside (a user) obtained via the information service section 59, to the external apparatus via radio communication. The electronic control section 49, the various sensors 50 to 58, the information service section 59, and the like may be referred to as input sections that receive input. For example, the PUSCH transmitted by the communication module 60 may include information based on the input.

The communication module 60 receives various pieces of information (traffic information, signal information, inter-vehicle distance information, and the like) transmitted from the external apparatus, and displays the various pieces of information on the information service section 59 included in the vehicle. The information service section 59 may be referred to as an output section that outputs information (for example, outputs information to devices, such as a display and a speaker, based on the PDSCH received by the communication module 60 (or data/information decoded from the PDSCH)).

The communication module 60 stores the various pieces of information received from the external apparatus in the memory 62 that can be used by the microprocessor 61. Based on the pieces of information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced, modified, created, or defined based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2021-169864 filed on Oct. 15, 2021, the entire contents of which are incorporated herein by reference.

The invention claimed is:

1. A terminal comprising:
   a receiver that receives information regarding activation of a transmission configuration indication (TCI) state; and
   a processor that controls monitoring of a downlink control channel related to paging, based on whether or not a TCI state corresponding to a serving cell is included in an activated TCI state.

2. The terminal according to claim 1, wherein when the TCI state corresponding to the serving cell is not included in the activated TCI state, the processor controls not to monitor a downlink control channel related to paging transmitted from an other cell different from the serving cell.

3. A radio communication method for a terminal, comprising:
   receiving information regarding activation of a transmission configuration indication (TCI) state; and
   controlling monitoring of a downlink control channel related to paging, based on whether or not a TCI state corresponding to a serving cell is included in an activated TCI state.

4. A base station comprising:
   a transmitter that transmits information regarding activation of a transmission configuration indication (TCI) state; and
   a processor that controls transmission of a downlink control channel related to paging, monitoring of the downlink control channel related to paging being controlled based on whether or not a TCI state corresponding to a serving cell is included in an activated TCI state.

5. A system comprising a terminal and a base station, wherein
   the terminal comprises:
      a receiver that receives information regarding activation of a transmission configuration indication (TCI) state; and
      a processor that controls monitoring of a downlink control channel related to paging, based on whether or not a TCI state corresponding to a serving cell is included in an activated TCI state, and
   the base station comprises:
      a transmitter that transmits the information.

* * * * *